(12) United States Patent
Li

(10) Patent No.: US 6,304,266 B1
(45) Date of Patent: Oct. 16, 2001

(54) METHOD AND APPARATUS FOR VOLUME RENDERING

(75) Inventor: Cen Li, Houston, TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/515,439

(22) Filed: Feb. 29, 2000

Related U.S. Application Data (60) Provisional application No. 60/139,028, filed on Jun. 14, 1999.

(51) Int. Cl.[7] .................................................. G06T 17/00
(52) U.S. Cl. ............................ 345/424; 345/571; 345/536
(58) Field of Search .................................. 345/424, 517, 345/511, 508, 530, 536, 571

(56) References Cited

U.S. PATENT DOCUMENTS

| | | | |
|---|---|---|---|
| 5,381,518 | * | 1/1995 | Drebin et al. ......................... 395/124 |
| 5,442,733 | * | 8/1995 | Kaufman et al. ..................... 195/124 |
| 5,807,448 | * | 9/1998 | Nakazawa .............................. 156/58 |
| 5,831,623 | * | 11/1998 | Negishi et al. ....................... 345/424 |
| 5,847,711 | * | 12/1998 | Kaufman et al. ..................... 345/424 |
| 5,963,211 | * | 10/1999 | Oikawa et al. ....................... 345/424 |
| 6,008,813 | * | 12/1999 | Lauer et al. .......................... 345/424 |
| 6,067,366 | * | 5/2000 | Simanovsky et al. ............... 382/100 |

* cited by examiner

*Primary Examiner*—Mark Zimmerman
*Assistant Examiner*—Mano Padmanabhan
(74) *Attorney, Agent, or Firm*—John H Bouchard; Howard L. Speight (57) ABSTRACT

A volume rendering process is disclosed. Data including a plurality of voxels are recorded. Each voxel includes an opacity-adjusted value representative of a value of a parameter at a location within the volume adjusted by applying an opacity curve to the value. A computer is used to process such data. The process includes partitioning the plurality of voxels among a plurality of slices. Each slice corresponds to a respective region of the volume. For each slice, the process apportions the plurality of voxels associated with that slice among a plurality of cells associated with that slice. Each cell corresponds to a respective sub-region of the region associated with that slice. For each cell, the process determines that the cell is nontransparent if more than a predetermined number of the voxels associated with that cell have an opacity-adjusted value greater than a predetermined value. Otherwise the cell is determined to be transparent. The process stores a texture value for each voxel for only nontransparent cells and renders the stored texture values.

31 Claims, 13 Drawing Sheets

| CELL | THRESHOLD=0 VOXELS=0 | THRESHOLD=3 VOXELS=2 |
|---|---|---|
| 1 | INVISIBLE | INVISIBLE |
| 2 | VISIBLE | INVISIBLE |
| ⋮ | | |
| MxN | VISIBLE | VISIBLE |

METHOD AND APPARATUS FOR VOLUME RENDERING

CROSS-REFERENCE TO RELATED APPLICATION

This application claims priority from provisional application Ser. No. 60/139,028, filed Jun. 14, 1999, entitled "Volume Rendering Using Checkboards."

FIELD OF THE INVENTION

This invention relates generally to the field of computer graphics. More particularly, this invention relates to volume rendering. Even more particularly, this invention relates to speedily rendering sparsely populated volumes.

BACKGROUND OF THE INVENTION

Volume rendering is an important area of computer graphics. It is employed in a wide variety of disciplines, including medicine, geology, biology and meteorology. Volume rendering allows a user to look inside an object and see features that were otherwise shielded by the rendering of the surface features.

Figure 1:
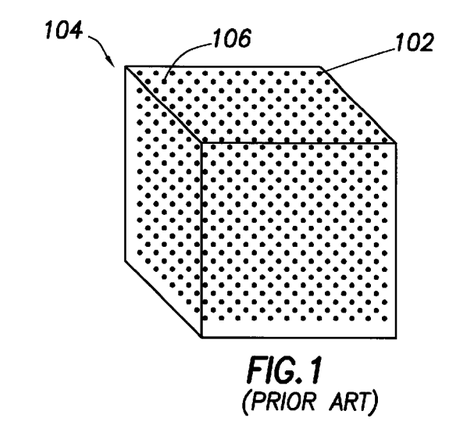
FIG. 1 is a representation of voxels within a volume.

Volumetric data consists of a 3D dataset of elements called "voxels" 102, as shown in FIG. 1. Typically, the voxels 102 are uniformly distributed throughout a volume 104. Each voxel 102 has a position in the volume, as shown in FIG. 1, and has associated with it information such as color, illumination, opacity, velocity, amplitude, etc. The information associated with each voxel 102 is produced by such disciplines as medicine (e.g., CAT scans), biology (confocal microscopy), and geoscience (seismic data).

Figure 2:
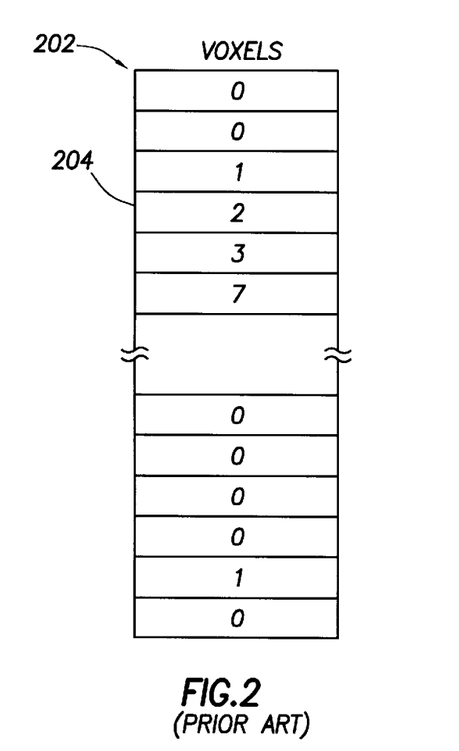
FIG. 2 is a representation of the storage of voxel values.

Typically, the values of the voxels 102 are stored in an array 202, as shown in FIG. 2. The position of a particular voxel in the volume is inherent in its location in the array. For example, array position 204 might be associated with a point 106 in the volume that is a specified distance from a specified corner of the volume. Typically, a single value is stored in the array 202 for each voxel 102, although it is also possible to store more than one value for each voxel 102.

Figure 3:
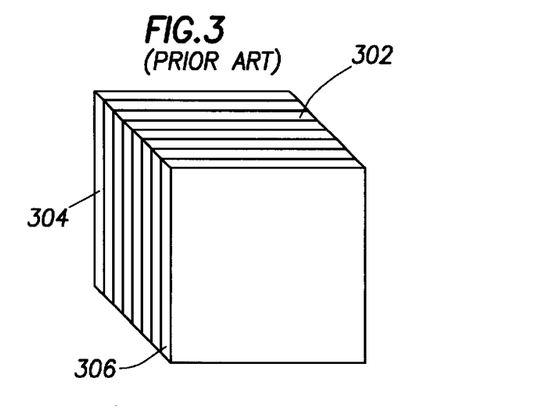
FIGS. 3–5 illustrate the partitioning of a volume into slices.
Figure 4:
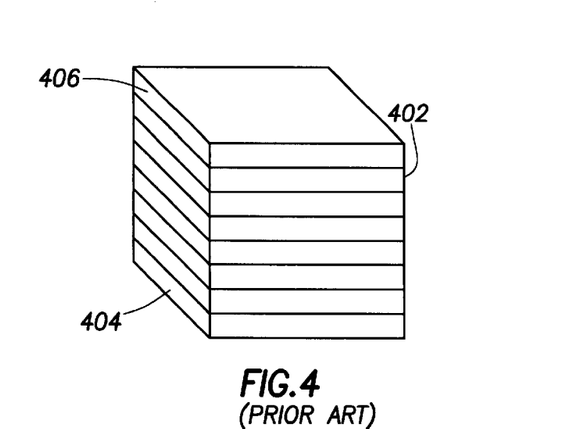
Figure 5:
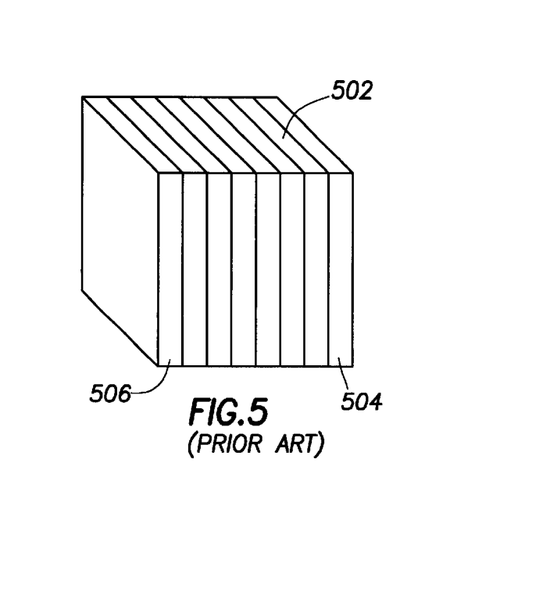

For rendering, the volume 104 is sliced into three sets of slices 302, 402 and 502, as shown in FIGS. 3, 4 and 5, along three different axes perpendicular to the respective set of slices. The voxels are partitioned among slices 302, 402 and 502. The partitioning is done based on the position of the voxels in array 202.

The rendering is then accomplished on a slice-by-slice basis, moving from the rear-most slice 304, 404 and 504, respectively, to the front-most slice 306, 406 and 506, respectively. The set of slices that is chosen to be processed is the set whose axis makes the smallest angle to the viewing direction.

Figure 6:
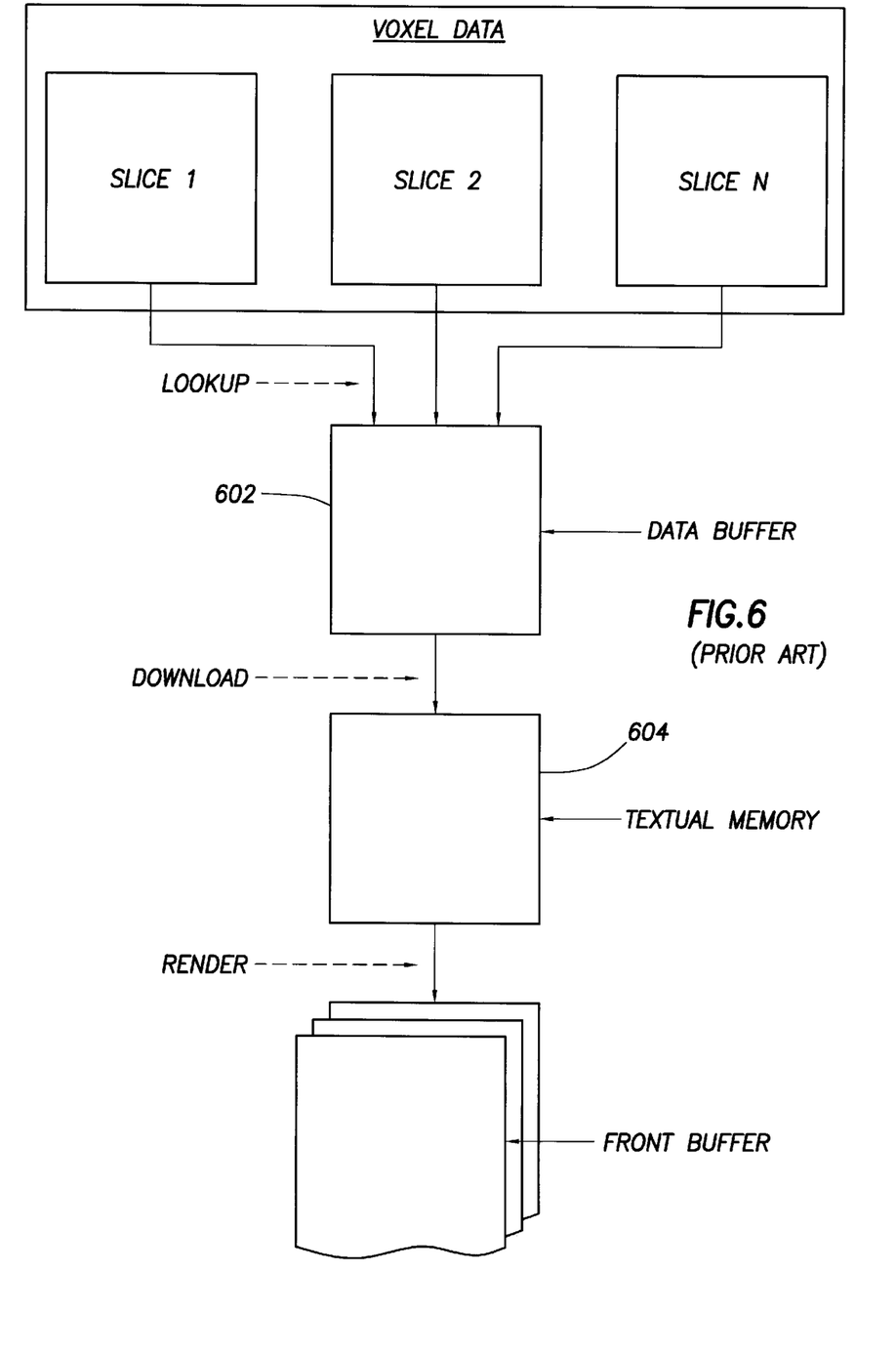
FIG. 6 is a representation of a prior art volume rendering process.
Figure 7:
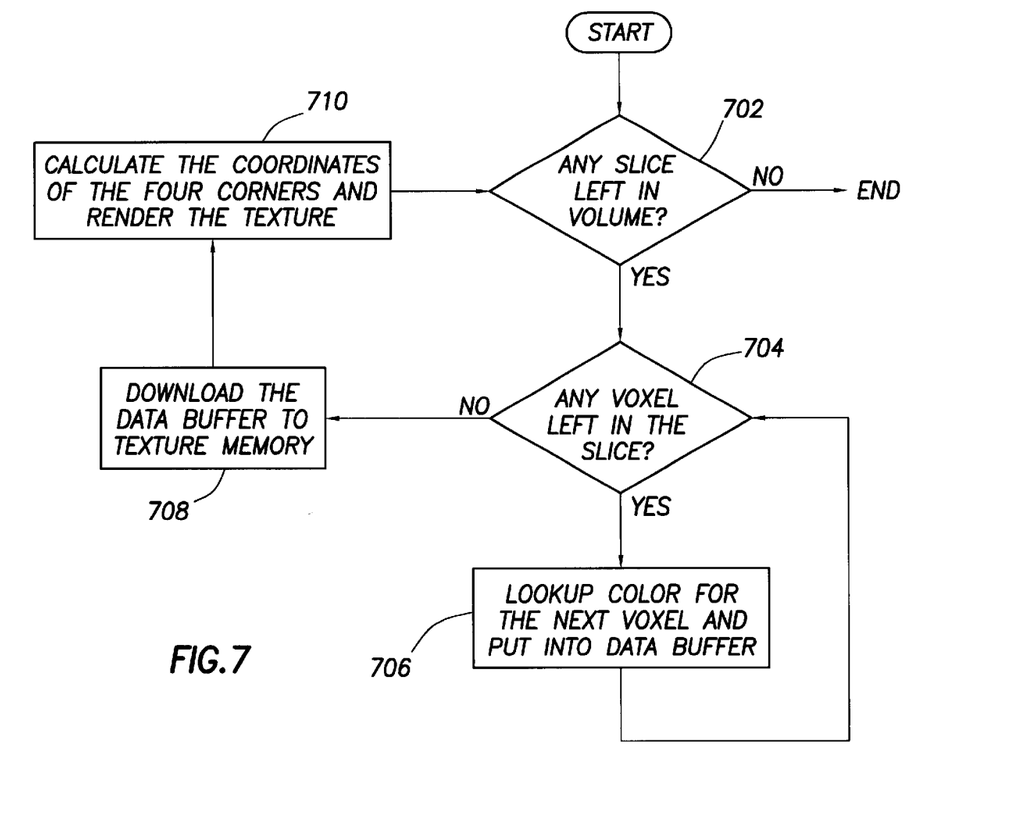
FIG. 7 are block diagrams of a prior art rendering process.

A texture value, or "texel," is determined for each voxel in each slice (blocks 702 and 704) as shown in FIGS. 6 and 7. The texels are stored in a data buffer 602 (block 706). Typically, the texel value is an indication of the color to be displayed for that voxel and is found in a look-up table. For example, the texel data may include a value for each of the red, green, and blue (RGB) components associated with the voxel.

Figure 8:
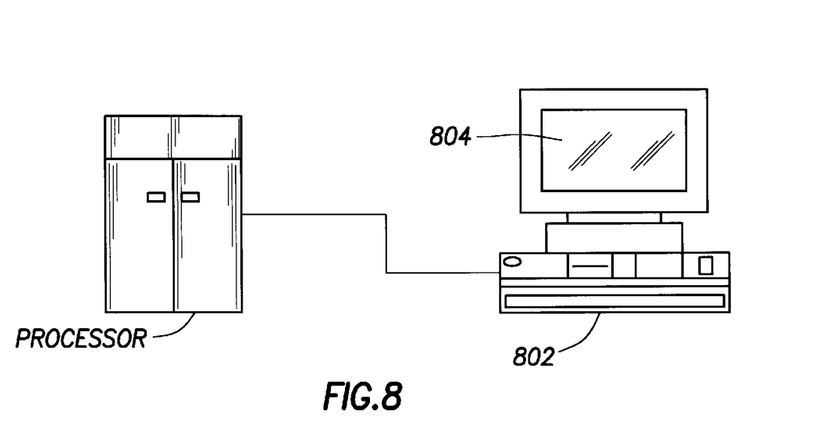
FIG. 8 is a block diagram of rendering equipment.

When all of the voxels in the slice have been processed (block 704), the contents of the data buffer are downloaded into a textual memory 604 (block 708). A display device 802, shown in FIG. 8, determines from information downloaded with the texel data which slice is to be displayed. Based on that information and the perspective requested by the user, the display device maps the texels onto pixels on a display screen 804 (block 710). As each slice is downloaded and rendered, the user sees the volume in the requested perspective. Each time the user changes the view, for example by using a tool to rotate, translate or magnify the volume, the process of downloading and rendering slices is repeated. The resulting display, illustrated in FIG. 9, shows the outside surfaces of the volume.

In some applications, greater flexibility is achieved by using semi-transparent data. Semi-transparent data includes an additional factor, alpha, along with the RGB components discussed above. The alpha value of a voxel determines the opacity of that voxel. Opacity is a measure of the amount a particular texel on a slice will allow a texel on a background slice that maps to the same pixel to show through. This is achieved by mixing the colors of the overlapping texels depending on their opacity. If the opacity of a texel is 0, it is transparent and it has no effect on the color of the displayed pixel. If its opacity is 1, it is opaque and, if it has no other texels mapped in front of it, it determines the color of the displayed pixel. If its opacity is between 0 and 1, the colors of two texels mapped to the same pixel are mixed in conventional ways to determine the color of the pixel that will be displayed.

Semi-transparent volumetric data is present in many applications such as geophysical seismic interpretation, magnetic imaging, and ultrasonography. In those cases, the value of the voxel is not only mapped to a color but also an alpha. The user can effect the mapping with an opacity tool, such as the one illustrated in FIG. 10. In FIG. 10, the user has adjusted the opacity mapping, shown graphically by curve 1002, to make transparent (alpha=0) all voxels except those having large positive or negative values. This has the effect of making most of the data transparent, as can be seen from the histogram 1004 which reflects the distribution of the values of the voxels in the data illustrated in FIG. 9.

Figure 9:
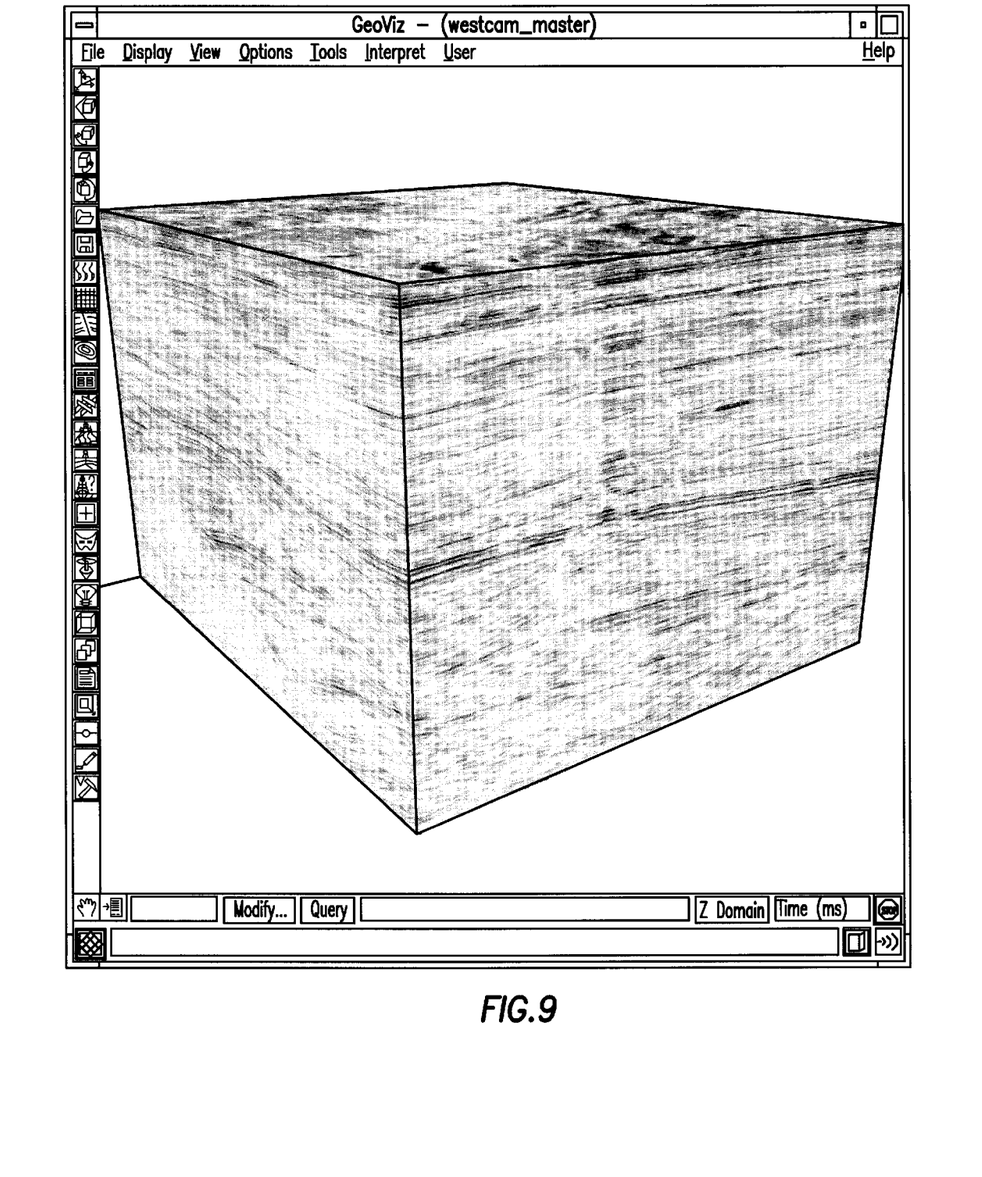
FIG. 9 is a rendering of an opaque volume.
Figure 10:
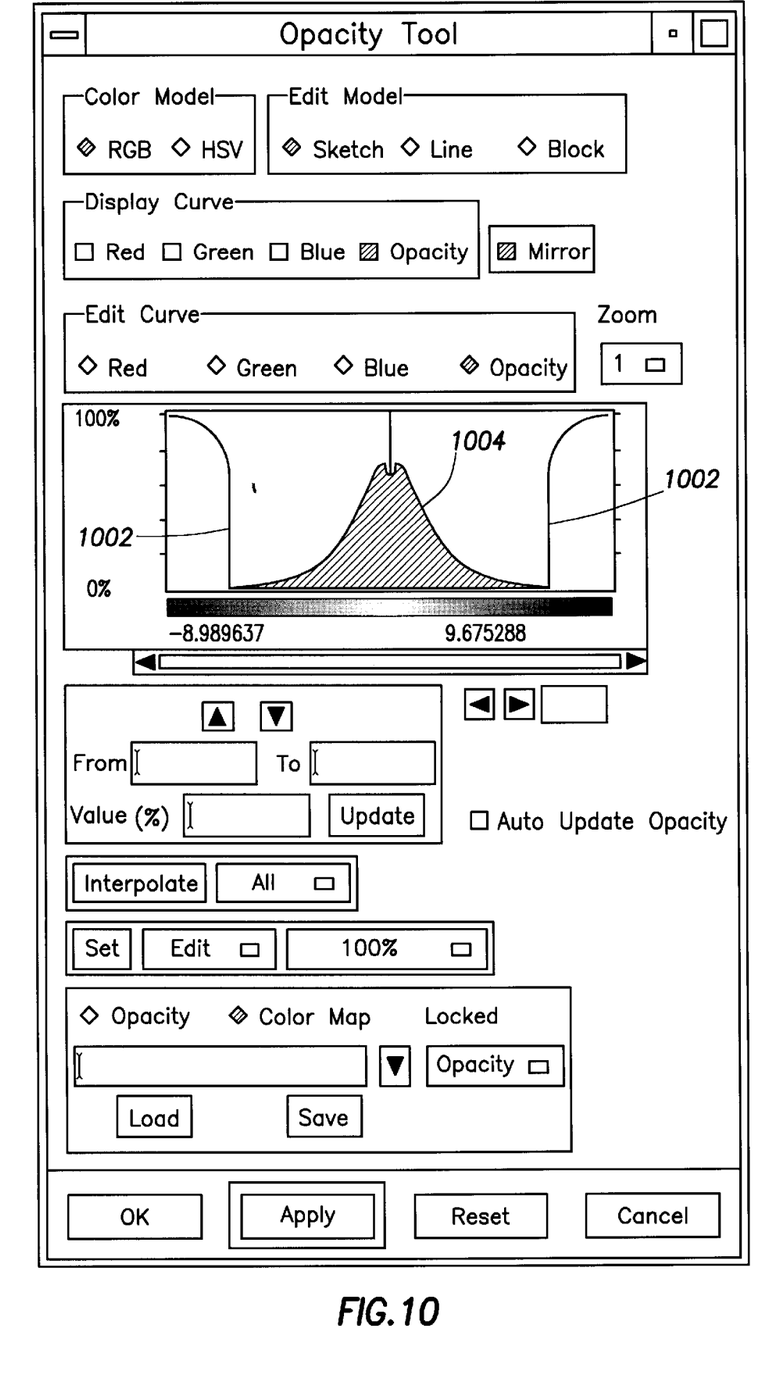
FIG. 10 is a representation of an opacity tool.
Figure 11:
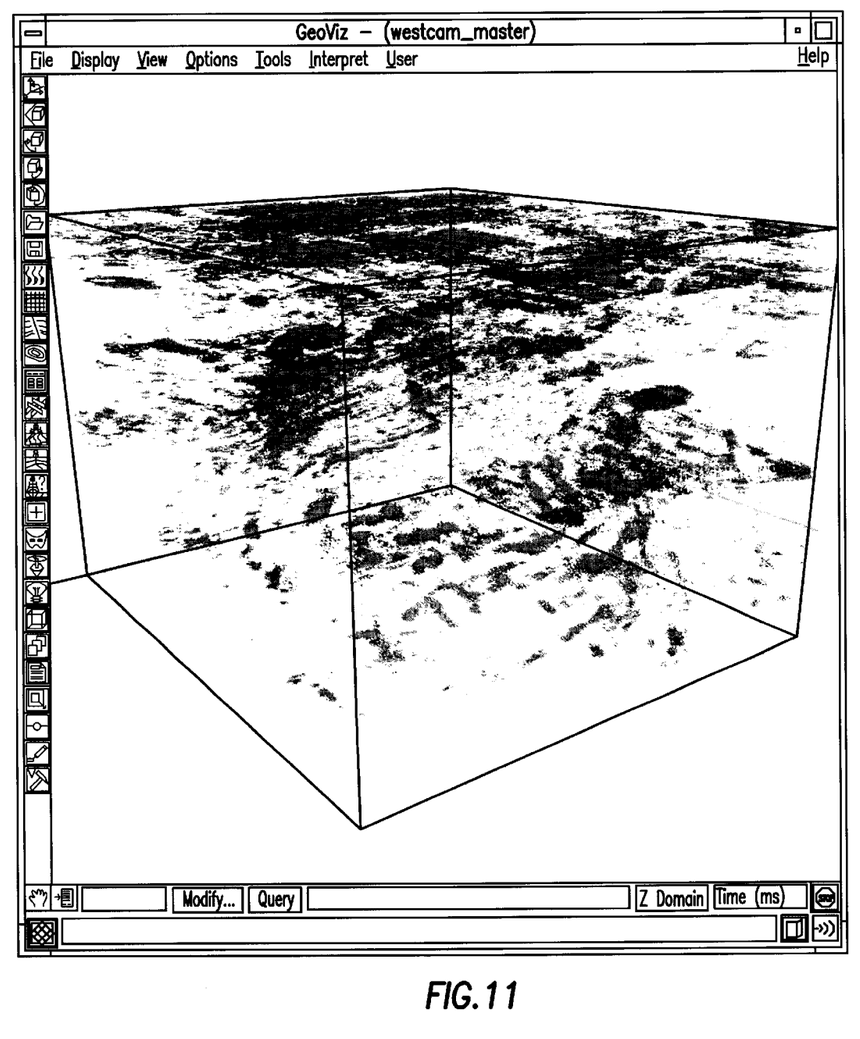
FIG. 11 is a rendering of a semi-transparent volume.

When the data displayed in FIG. 9 is processed using the opacity tool shown in FIG. 10, the result is the display shown in FIG. 11. The surface of the volume no longer obscures structures inside the volume.

It is also apparent from the histogram 1004 and FIG. 11 that most of the opacity-adjusted voxels are transparent and have no effect on the display.

SUMMARY OF THE INVENTION

In general, in one aspect, the invention features volume rendering wherein data comprising a plurality of voxels are recorded. Each voxel comprises an opacity-adjusted value representative of a value of a parameter at a location within the volume adjusted by applying an opacity curve to the value. A computer is used that is adapted to process such data. The invention comprises an article of manufacture comprising a medium that is readable by the computer and that carries instructions for the computer to perform a process. The process comprises partitioning the plurality of voxels among a plurality of slices. Each slice corresponds to a respective region of the volume. For each slice, the process apportions the plurality of voxels associated with that slice among a plurality of cells associated with that slice. Each cell corresponds to a respective sub-region of the region associated with that slice. For each cell, the process determines that the cell is nontransparent if more than a predetermined number of the voxels associated with that cell have an opacity-adjusted value greater than a predetermined value. Otherwise the cell is determined to be transparent. The process stores a texture value for each voxel for only nontransparent cells and renders the stored texture values.

Implementations of the invention may include one or more of the following. The predetermined number may be 0. The predetermined value may be 0. Storing may comprise storing the texture values in a data buffer. The process may further comprise downloading the contents of the data buffer to a textual memory. The process may further comprise setting a transparency flag in a transparency flag array for each nontransparent cell and clearing the transparency flag for transparent cells. Each transparency flag may be one bit. The plurality of voxels may be divided among a plurality of sets of slices. Each set of slices may be associated with a view of the volume. The plurality of sets of slices may comprise 3 sets. The process may further comprise setting a transparency flag in a transparency flag array for each non-transparent cell. The transparency flag array may have one bit associated with each cell. The process may further comprise clearing the transparency flag for transparent cells. Each cell may have a corresponding cell in the other views. The transparency flags for the corresponding cells may be stored in a single byte.

In general, in another aspect, the invention features volume rendering wherein data comprising a plurality of voxels are recorded. Each voxel comprises a value representative of a parameter at a location within the volume. A computer is used that is adapted to process such data. The invention comprises an article of manufacture comprising a medium that is readable by the computer and that carries instructions for the computer to perform a process. The process comprises for each voxel, determining an opacity-adjusted value by applying an opacity curve to the value of the voxel. The process further comprises partitioning the plurality of voxels among a plurality of slices, each slice corresponding to a respective region of the volume. The process further comprises for each slice, apportioning the plurality of voxels associated with that slice among a plurality of cells associated with that slice, each cell corresponding to a respective sub-region of the region associated with that slice. For each cell, the process comprises determining that the cell is nontransparent if more than a predetermined number of the voxels associated with that cell have an opacity-adjusted value greater than a predetermined value and otherwise that the cell is transparent. The process further comprises rendering the voxels of the nontransparent cells using Red-Green-Blue-Alpha values, where the Red, Green and Blue values are a color which is determined by the value of the voxel and the Alpha value is an opacity value corresponding to the opacity-adjusted value of the voxel.

Implementations of the invention may include one or more of the following. The process may further comprise looking up texels for each voxel associated with a non-transparent cell. The process may further comprise storing the texels associated with non-transparent cells in a data buffer. The process may further comprise downloading the contents of the data buffer to a textual memory. The contents of the data buffer may be downloaded when the data buffer is full.

In general, in another aspect, the invention features a method for rendering a volume. The method is performed by a computer operating on data comprising a plurality of voxels. Each voxel comprises a value representative of a parameter at a location within the volume. The method comprises for each voxel, determining an opacity-adjusted value by applying an opacity curve to the value of the voxel. The method further comprises partitioning the plurality of voxels among a plurality of slices. The process further comprises for each slice, partitioning the plurality of voxels associated with that slice among a plurality of cells associated with that slice. The process further comprises for each cell, setting an otherwise unset transparency flag associated with that cell if more than a predetermined number of the voxels associated with that cell have an opacity-adjusted value greater than a predetermined value. The method further comprises storing in a buffer a texture value for each voxel for only those cells having a set transparency flag. The method further comprises downloading the cells stored in the buffer into a texture memory. The method further comprises unpacking the downloaded cells from the texture memory. The method further comprises rendering the unpacked cells to the proper locations in space on a display device.

Implementations of the invention may include one or more of the following. The predetermined number may be 0. The predetermined value may be 0. Downloading may occur when the data buffer is full. Storing may comprise storing connected cells in adjacent portions of the data buffer. Storing connected cells may comprise storing horizontally connected cells in adjacent portions of the data buffer. Storing connected cells comprises storing vertically connected cells in adjacent portions of the data buffer. The method may further comprise rendering connected cells together.

In general, in another aspect, the invention features volume rendering apparatus adapted to be disposed in a workstation and responsive to data comprising a plurality of voxels. Each voxel comprises an opacity-adjusted value representative of a value of a parameter at a location within the volume adjusted by applying an opacity curve to the value. The apparatus comprises first means for partitioning the voxels among a plurality of slices. The apparatus further comprises second means for partitioning the plurality of voxels associated with each slice among a plurality of cells associated with each slice. The apparatus further comprises third means for identifying non-transparent cells. The apparatus further comprises fourth means for rendering only the non-transparent cells.

Implementations of the invention may include one or more of the following. The third means may comprise means for identifying cells in which more than a predetermined number of the voxels have opacity-adjusted values greater than a predetermined value. The predetermined number may be 0. The predetermined value may be 0. The apparatus may further comprise fifth means for converting the voxels in only the non-transparent cells to texels. The apparatus may further comprise sixth means for storing in a data buffer the texels associated with only the non-transparent cells. The apparatus may further comprise seventh means for downloading from the data buffer to a textual memory only the texels associated with non-transparent cells. The seventh means may comprise means for downloading when the data buffer is full.

DESCRIPTION OF THE PREFERRED EMBODIMENTS

Figure 12:
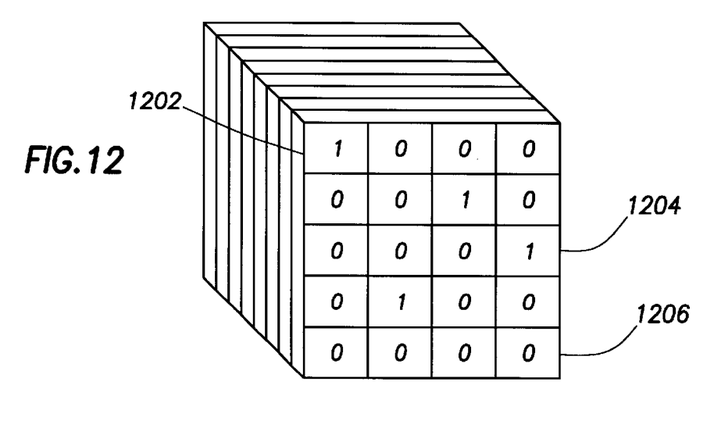
FIGS. 12–14 illustrate the partitioning of a volume into slices and cells according to the present invention.
Figure 13:
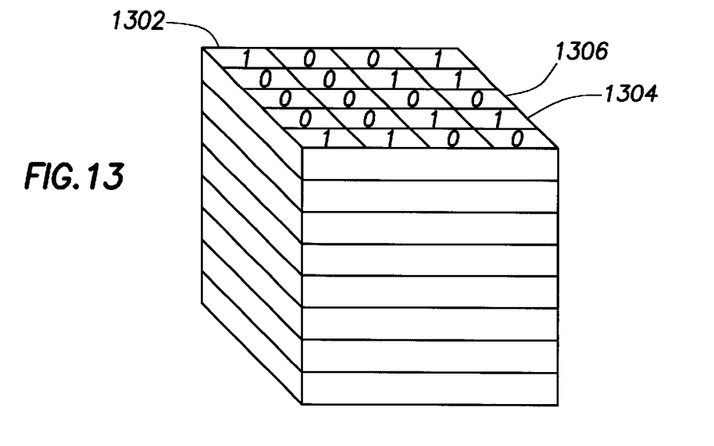
Figure 14:
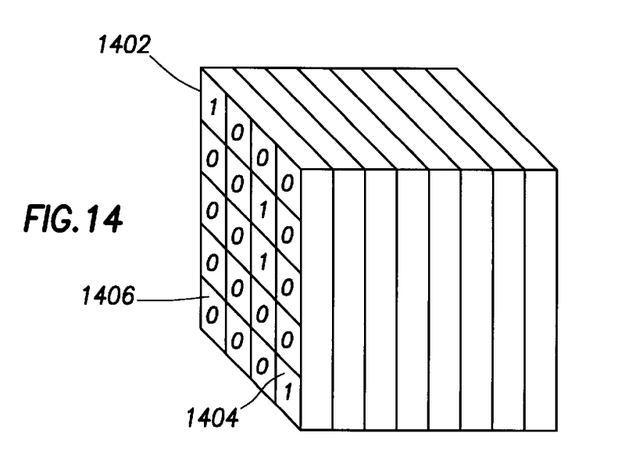

The invention speeds volume rendering by reducing the number of transparent voxels that are transformed into texels, downloaded and rendered. This is accomplished by partitioning each of the slices illustrated in FIGS. 3, 4 and 5 into cells 1202, 1302, 1402, as illustrated in FIGS. 12, 13 and 14. The figures show that each slice has been partitioned into a checkerboard of 20 cells, four rows and five columns. Each cell contains M·N voxels, where M and N are preferably powers of 2 (2, 4, 8, 16, etc.). Experimentation has shown that an optimal cell size for rendering seismic data is 4×16 (M=4, N=16) or four columns and sixteen rows of voxels in each cell. A different partitioning might be appropriate for other data, such as medical or meteorological data. The size and number of partitions is tuned based on the distribution of data in the volume.

Figure 15:
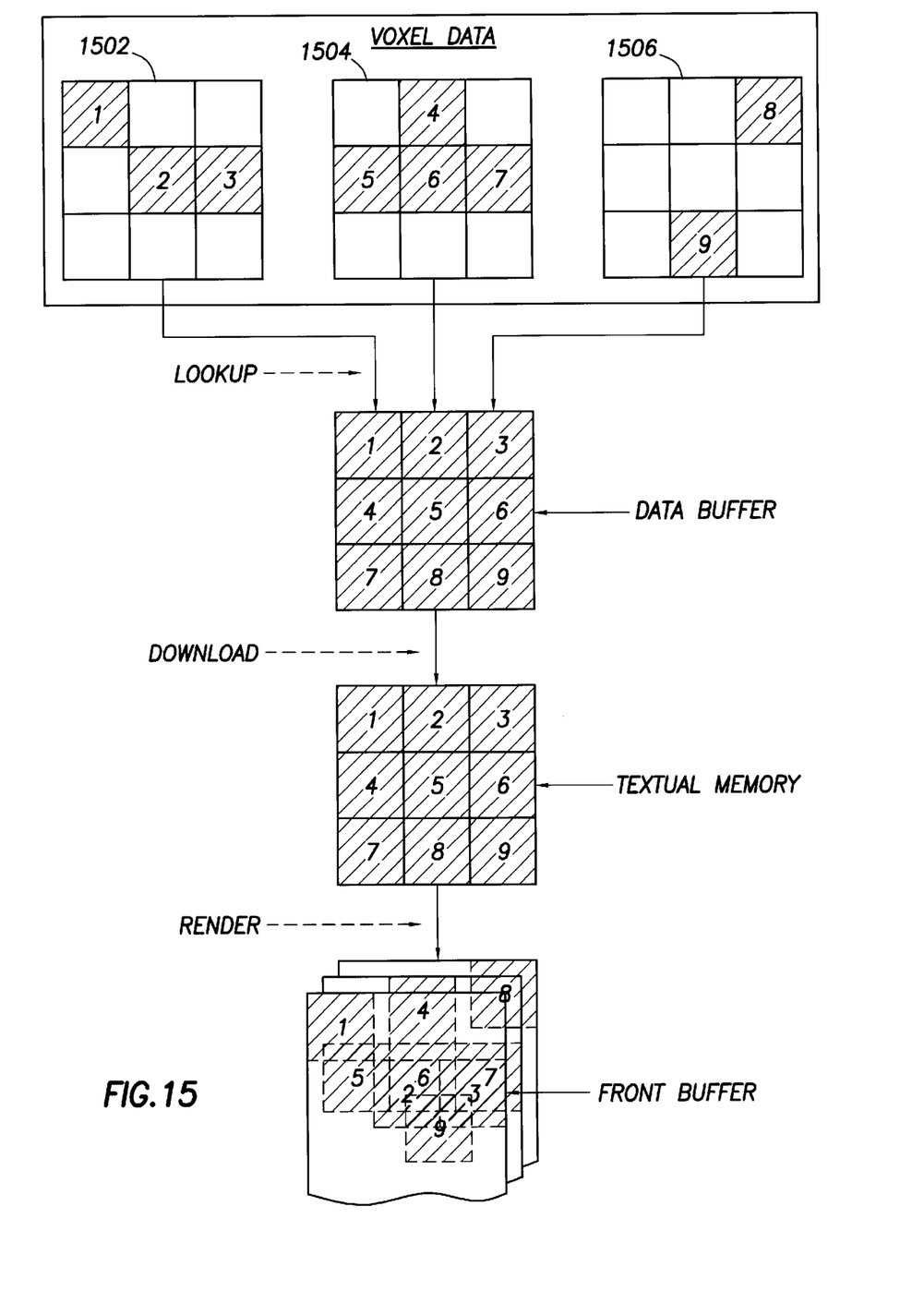
FIG. 15 is a representation of a volume rendering process according to the present invention.

In overview, only those cells that contain visible data are transformed into texels, downloaded and rendered, as illustrated in FIG. 15. During preprocessing, which is discussed in detail below, three slices 1502, 1504 and 1506 are partitioned into nine cells each. The number of slices and cells shown in FIG. 15 was chosen for simplicity of presentation and is not a limitation.

During preprocessing, the invention determines which cells are visible and which are not. In FIG. 15, the cross-hatched cells have been determined to be visible and those that are not cross-hatched to be invisible. Only the visible cells are converted to texels and stored in the data buffer. Consequently, only the visible cells are downloaded into textual memory and rendered. This means that the process saves time: (1) in texture lookup because invisible cells are not processed; and (2) in downloading from the data buffer.

Preprocessing accomplishes two things. First, preprocessing partitions the slices into cells. Second, preprocessing creates for each of the three views the checkerboard illustrated in FIGS. 12, 13 and 14. The checkerboard indicates which of the cells is visible (or non-transparent) with a "1" and which are invisible (or transparent) with a "0." Thus, cells 1204, 1304 and 1404 are visible and cells 1206, 1306 and 1406 are invisible.

Figure 16:
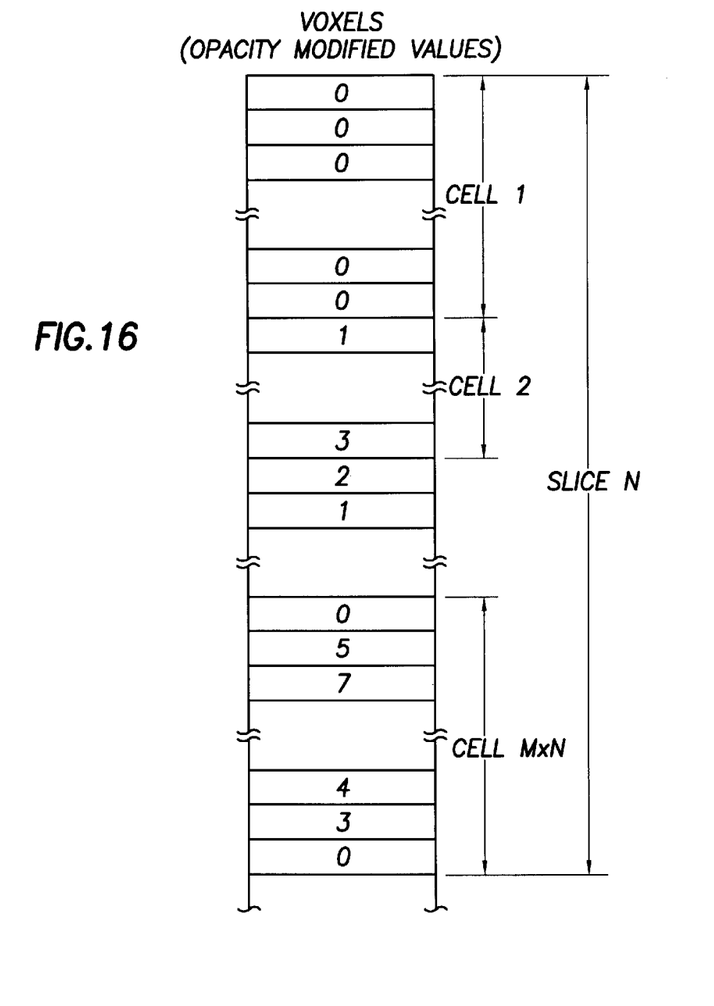
FIG. 16 is a representation of the partitioning of voxels among slices and cells according to the present invention.

Preprocessing begins by partitioning the slices into cells, as is shown in FIG. 16. As can be seen, a first set of voxels is associated with cell 1, a second set with cell 2 and so on until all of the voxels in the slice have been associated with a cell. The same process is repeated for each slice in the view. The same process is repeated for each slice in the other two views. Note that while in FIG. 16 contiguous ranges of memory locations are associated with cells, this is not normally the case. Usually, the voxels associated with a cell are stored in non-adjacent locations in memory.

Figure 17:
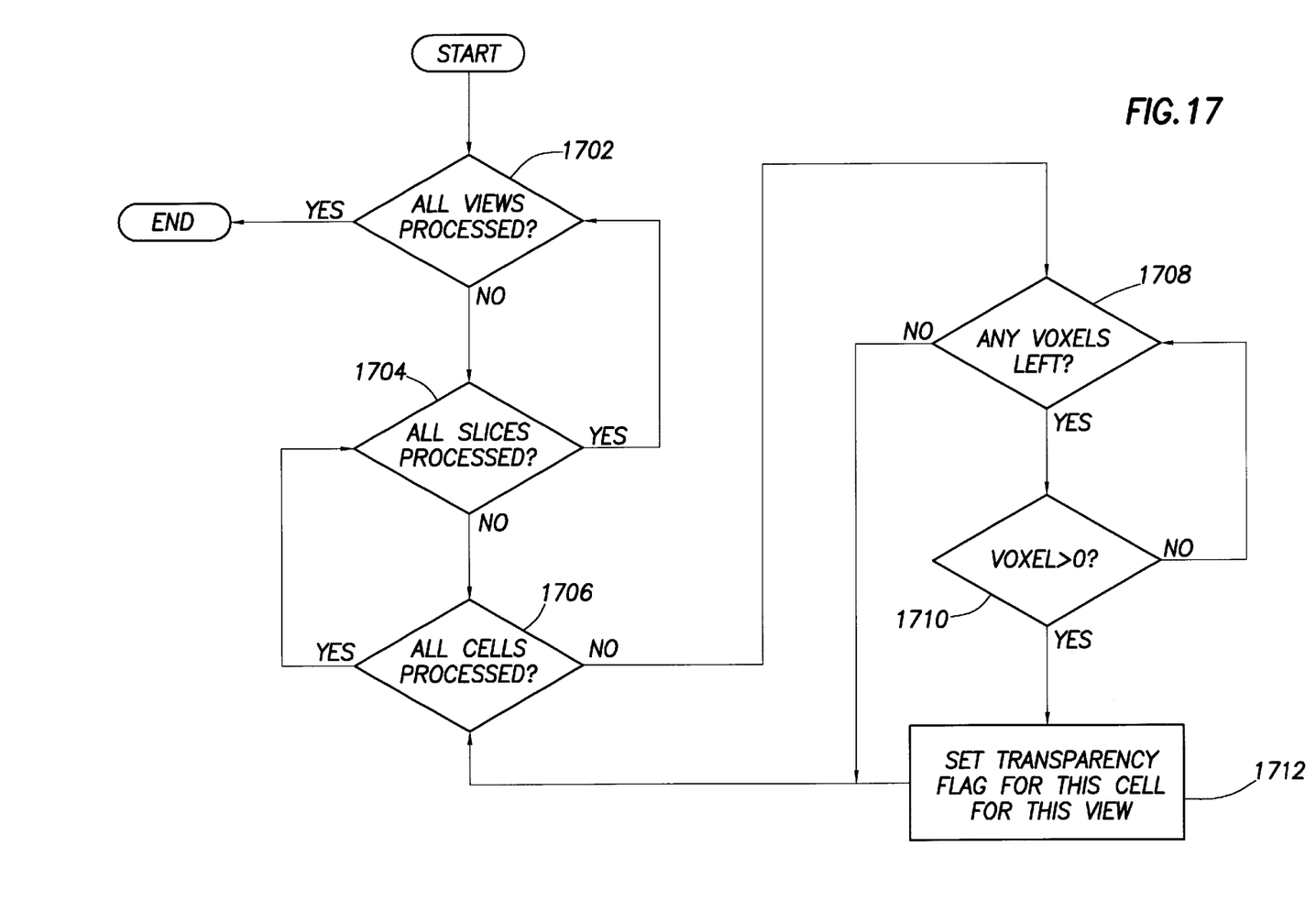
FIG. 17 is a flow chart of the preprocessing of data according to the present invention.

The determination of which cells are visible is accomplished for each of the three views, as illustrated in FIG. 17. The process performs the same processing for all of the views (block 1702), for each slice within the view (block 1704), and for each cell within the slice (block 1706). The process goes through each voxel associated with the cell (block 1708) to determine if its opacity-adjusted value is greater than zero (block 1710). The opacity-adjusted value of each voxel is determined by applying an opacity curve, such as curve 1002 shown in FIG. 10, to the value of the voxel. For example, using the example shown in FIG. 10, if a voxel has a value lying in the portion of the histogram 1004 that is mapped to zero, its opacity-adjusted value will be 0. If the voxel has a value that lies in a portion of the histogram 1004 that is not mapped to zero, its opacity-adjusted value will be the same as its original value.

As soon as the process finds a voxel having an opacity-adjusted value greater than zero, it sets the transparency flag for that cell to "1" (block 1712). If none of the voxels in the cell have a value greater than zero, the transparency flag for that cell retains its "0" value.

Figure 18:
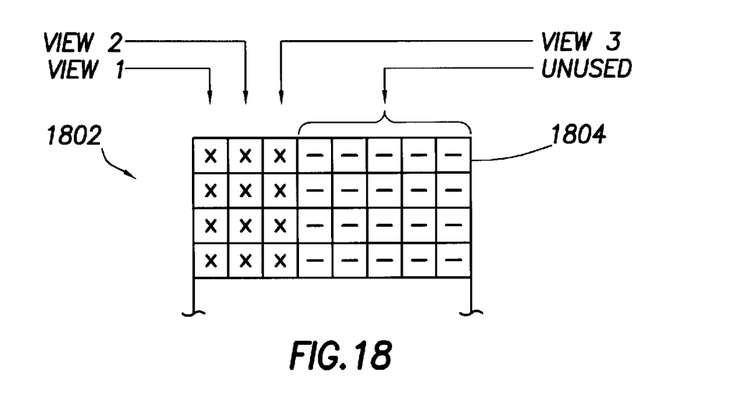
FIG. 18 is a representation of the checkerboard array or transparency flag array according to the present invention.

The transparency flags for all of the cells are maintained in an array 1802, illustrated in FIG. 18. Each cell in each view is assigned a single bit to hold its transparency flag. The bits for the transparency flags associated with corresponding cells are stored in the same byte. For example, the cell in row 1, column 1 of each view, i.e. cells 1202, 1302 and 1402, are stored in bits 0, 1 and 2, respectively of the first byte 1804 in the transparency flag array 1802. The remaining bits are not used.

Figure 19:
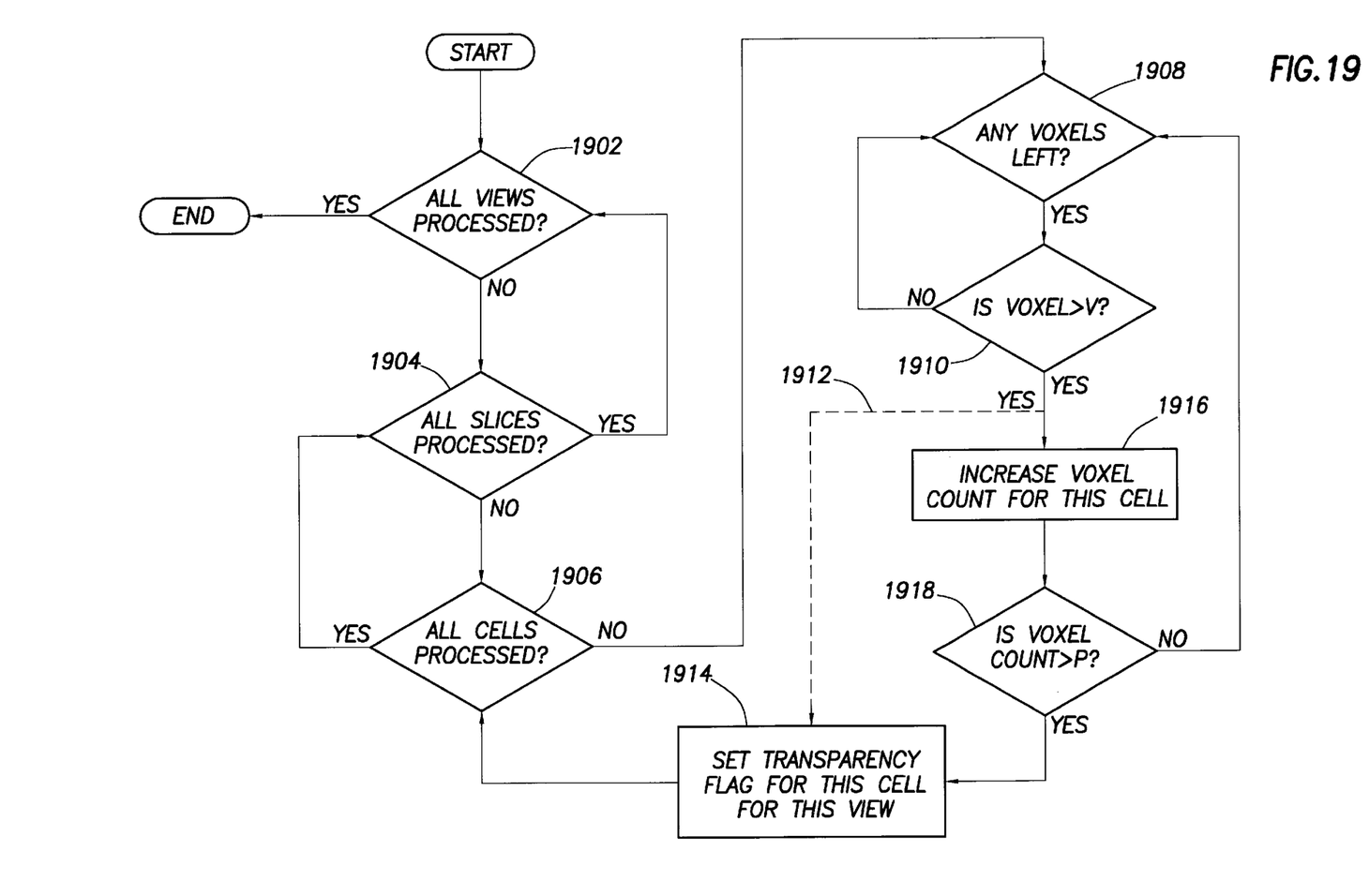
FIG. 19 is a flow chart of the preprocessing of data according to the present invention.

Alternatively, rather than setting the transparency flag for each cell if any voxel has a value greater than 0, the transparency flag can be set if any voxel has a value greater than a predetermined amount, or if more than a predetermined number of voxels have a value greater than a predetermined amount, as illustrated in FIG. 19. The process performs the same processing for all of the views (block 1902), for each slice within the view (block 1904), and for each cell within the slice (block 1906). The process goes through each voxel associated with the cell (block 1908) to determine if its value, after being modified by an opacity curve, as described above, is greater than a predetermined value (block 1910). In one embodiment represented by dashed line 1912 in FIG. 19, as soon as the process finds a voxel having a value greater than the predetermined amount, it sets the transparency flag for that cell to "1" (block 1914). If none of the voxels in the cell have a value greater than V, the transparency flag for that cell retains its "0" value.

In another embodiment, when the process encounters a voxel with a value greater than the predetermined amount V it increases a voxel count (block 1916). The voxel count is reset for each cell. If the voxel count is greater than a predetermined number P (block 1918), the transparency flag is set for that cell (block 1914). Alternatively, the process could wait until all of the voxels in a cell have been processed before comparing the voxel count to P. Further, if V and P are set to zero, the processing in FIG. 19 is very similar to the processing in FIG. 17.

Figure 20:
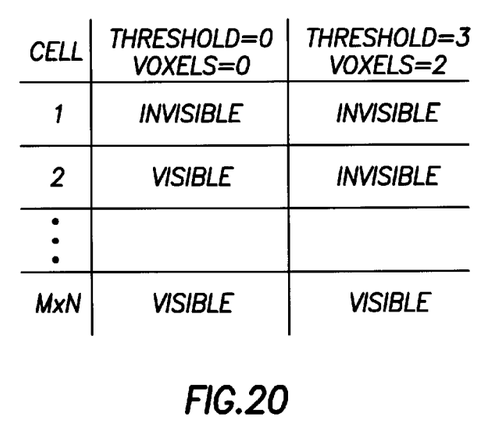
FIGS. 20–22 is a representation of the visibility or invisibility of the cells illustrated in FIG. 16.
Figure 21:
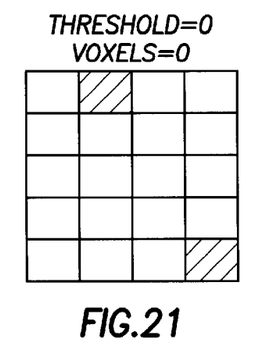
Figure 22:
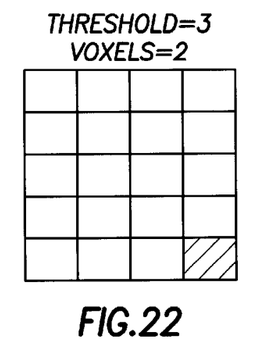

The two different processing techniques may produce different results, as illustrated in FIGS. 20, 21 and 22. FIG.

16 shows a set of voxels partitioned into slices (only one is shown) and cells, with the values being the opacity-modified values of the voxels. If the data illustrated in FIG. 16 is processed first by the technique shown in FIG. 17 and second by the technique shown in FIG. 19, with V=3 and P=2, cell 1 will be invisible in both sets of results as shown in FIGS. 20, 21, and 22. Cell 2 will be visible under the FIG. 17 technique, because at least one voxel has a modified value greater than zero, and invisible under the FIG. 19 technique, because only one voxel has a modified value greater than 3. Finally, cell M×N will be visible under both techniques because three voxels have a modified value greater than 3.

Preprocessing need be done only once unless the user changes the opacity curve. In that case, the modified values of the voxels will change and so, consequently, will the transparency checkerboard. Similarly, the preprocessing will be redone if the number or distribution of cells is changed.

Figure 23:
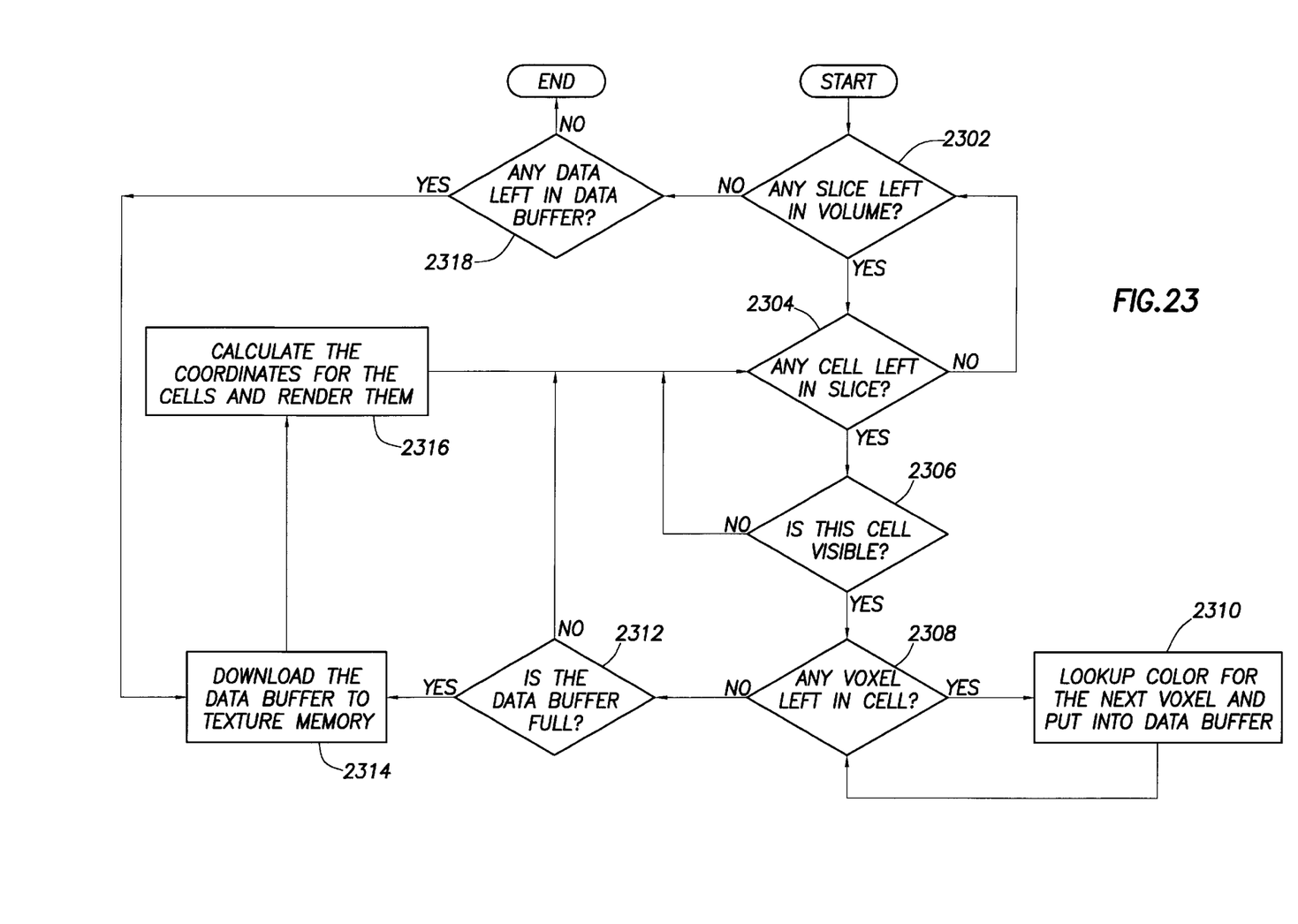
FIG. 23 is a flow chart of volume rendering according to the present invention.

Once preprocessing is complete the processed data can be used for rendering, as illustrated in FIG. 23. The process performs the same processing for all of the views, for each slice within the view (block 2302), and for each cell within the slice (block 2304). The process determines whether a cell is visible by looking at the corresponding transparency flag in the array 1802 (block 2306). If the cell is visible, the M×N voxels in the cell are converted to texels. Otherwise, the cell is skipped. Skipping invisible cells can effectively reduce the time spent in the texture lookup stage. In studies with the GEOVIZ product of Schlumberger-GeoQuest, the assignee of the present invention, on average the transparency flag of 30 percent of the cells will be set to 1, with 5 percent of the samples nontransparent. As a result, texture lookup takes only about 30 percent of the original time. The extra overhead of referring to the array of transparency flags once for every M×N voxels is almost negligible.

Figure 24:
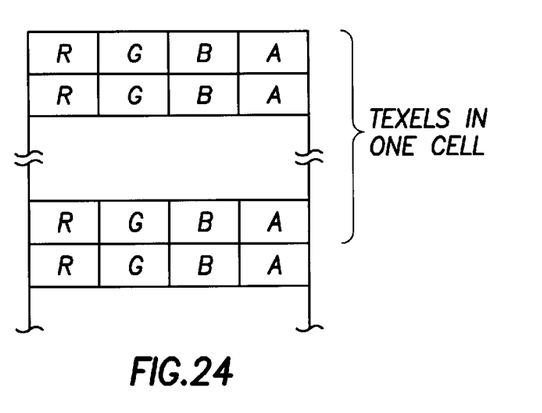
FIG. 24 is a representation of the storage of data in a data buffer.

Continuing with the description of FIG. 23, each voxel of a visible cell (block 2308) is converted by looking up color and opacity for the value of the voxel using lookup tables and opacity curves and storing the results in a data buffer (block 2310). The 2D array of texels for each cell, indexed by column and row, is organized in the data buffer as shown in FIG. 24. Note that while in FIG. 24 contiguous ranges of memory locations in the data buffer are associated with the illustrated cell, this is not normally the case. Usually, the texels associated with a cell are stored in non-adjacent locations in the data buffer.

When the data buffer is full (block 2312) it is downloaded to the texture memory (block 2314). The cells to be rendered are determined by accessing a pointer to the transparency flag array 1802. The pointer is advanced in the transparency flag array 1802 until it encounters a "1" entry. The coordinates for that cell on the screen are determined based on the position of the entry in the transparency flag array 1802. The cell is then rendered using conventional techniques (block 2316). Once all of the cells and slices in a view are processed, any data left in the data buffer (block 2318) is downloaded and rendered (blocks 2314 and 2316).

Only texels associated with visible cells are downloaded to the texture memory. For texture rendering, the array 1802 of transparency flags is used to unpack the cells and render them to the proper locations in space. Visible cells which are connected horizontally are rendered together, by virtue of the order in which they were packed into the data buffer, unless connectivity is broken by a row change in texture memory, as illustrated in FIG. 15. Cells 2 and 3 are horizontally connected and rendered together. Cell 5, 6 and 7 are horizontally connected but only cells 5 and 6 are rendered together. Cell 7 is rendered separately because there is a row change in the data buffer after cell 6.

Horizontal connectivity is used in the example illustrated in FIG. 15 because seismic data is more horizontally continuous than vertically. However, if the data being rendered is more continuous vertically, then the cells can be traversed vertically in texture lookup and rendering.

Breaking texture rendering into small blocks slows rendering by a small amount. On an SGI workstation (MXI, IR), the effect is negligible. On a Sun workstation (Creator 3D, Elite 3D), the rendering time can still be cut by more than half with 30 percent of the cells non-transparent. Even with 100 percent of the cells non-transparent, the cells are connected into horizontal strips and the rendering is only about 15 percent slower.

The checkerboard application just described has been implemented within GEOVIZ, which is a tool used by geophysicists, geologists and other geoscientists to create 3D models that aid in the analysis and interpretation of geoscience data. GEOVIZ renders seismic volumes using 2D textures using OpenGL on both SUN and SGI machines. These volumes are rendered in slices from front to back, as described above. Each slice can be an inline (x), crossline (y), or time (z) slice, depending on which rendering direction is closest to the viewing direction.

Semi-transparent volume rendering is one of the most data and graphic intensive actions in GEOVIZ. FIG. 9 illustrates a fully opaque volume. Seismic data usually has a bell shaped amplitude distribution 1004, as shown in FIG. 10. Consequently, users in GEOVIZ usually set the opacity curve 1002 to hide seismic data that constitutes the middle peak of the bell shaped amplitude distribution, as shown in FIG. 10. In the worst case, less than 5 percent of the volume data is non-transparent under this setting. Nevertheless, without the invention GEOVIZ renders the volume as if all of the data were fully opaque. This results in the unnecessary rendering of transparent voxels.

Studies show that the invention can effectively increase the speed of semi-transparent volume rendering if the peak of the amplitude distribution is set to be invisible. On Sun (Creator3D, Elite3D), the entire rendering time is 8–24 percent of the original. On Onyx/IR, the rendering time is 8–15 percent of the original. The above numbers vary depending on the actual distribution of volume data. The fluctuation is small comparing to the overall performance gain. Table 1 shows benchmarking results comparing checkerboard rendering with normal rendering times in seconds.

TABLE 1

Average rendering times in seconds of normal rendering compared to checkerboard rendering.

| Volume Size | 60 Mb | | 100 Mb | | 120 Mb | |
| --- | --- | --- | --- | --- | --- | --- |
| Rendering Direction | Inline | Time | Inline | Time | Inline | Time |
| SUN Ultra 60/Creator 3D | | | | | | |
| Normal | 17 | 45 | 26 | 102 | 70 | 90 |
| Checkerboard | 7 | 5 | 5.5 | 8 | 9 | 9 |
| Percentage of Time Saved | 76% | 91% | 79% | 92% | 87% | 90% |
| SGI Octane/EMXI | | | | | | |
| Nonnal | 10 | 10 | 20 | 70 | 35 | 130 |
| Checkerboard | 1.5 | 1.5 | 3 | 6 | 6 | 11 |
| Percentage of Time Saved | 85% | 85% | 85% | 91% | 83% | 92% |

The foregoing describes preferred embodiments of the invention and is given by way of example only. The invention is not limited to any of the specific features described herein, but includes all variations thereof within the scope of the appended claims.

What is claimed is:

1. In volume rendering wherein data comprising a plurality of voxels are recorded, each voxel comprising an opacity-adjusted value representative of a value of a parameter at a location within the volume adjusted by applying an opacity curve to the value, and wherein a computer is used that is adapted to process such data, an article of manufacture comprising:

a medium that is readable by the computer and that carries instructions for the computer to perform a process comprising:

partitioning the plurality of voxels among a plurality of slices, each slice corresponding to a respective region of the volume;

for each slice, apportioning the plurality of voxels associated with that slice among a plurality of cells associated with that slice, each cell corresponding to a respective sub-region of the region associated with that slice;

for each cell, determining that the cell is nontransparent if more than a predetermined number of the voxels associated with that cell have an opacity-adjusted value greater than a predetermined value and otherwise determining that the cell is transparent;

storing a texture value for each voxel for only non-transparent cells; and rendering the stored texture values.

2. The article of manufacture of claim 1 wherein the predetermined number is 0.

3. The article of manufacture of claim 1 wherein the predetermined value is 0.

4. The article of manufacture of claim 1 wherein storing comprises storing the texture values in a data buffer and wherein the process further comprises:

downloading the contents of the data buffer to a textual memory.

5. The article of manufacture of claim 1 wherein the process further comprises setting a transparency flag in a transparency flag array for each nontransparent cell; and clearing the transparency flag for transparent cells.

6. The article of manufacture of claim 5 wherein each transparency flag is one bit.

7. The article of manufacture of claim 1 wherein the plurality of voxels are divided among a plurality of sets of slices, each set being associated with a view of the volume.

8. The article of manufacture of claim 7 wherein the plurality of sets of slices comprises 3 sets.

9. The article of manufacture of claim 8 wherein the process further comprises setting a transparency flag in a transparency flag array for each non-transparent cell, the transparency flag array having one bit associated with each cell; and clearing the transparency flag for transparent cells.

10. The article of manufacture of claim 9 wherein each cell has a corresponding cell in the other views and wherein the transparency flags for the corresponding cells are stored in a single byte.

11. In volume rendering wherein data comprising a plurality of voxels are recorded, each voxel comprising a value representative of a parameter at a location within the volume, and wherein a computer is used that is adapted to process such data, an article of manufacture comprising:

a medium that is readable by the computer and that carries instructions for the computer to perform a process comprising:

for each voxel, determining an opacity-adjusted value by applying an opacity curve to the value of the voxel;

partitioning the plurality of voxels among a plurality of slices, each slice corresponding to a respective region of the volume;

for each slice, apportioning the plurality of voxels associated with that slice among a plurality of cells associated with that slice, each cell corresponding to a respective sub-region of the region associated with that slice;

for each cell, determining that the cell is nontransparent if more than a predetermined number of the voxels associated with that cell have an opacity-adjusted value greater than a predetermined value and otherwise that the cell is transparent; and rendering the voxels of the nontransparent cells using Red-Green-Blue-Alpha values, where the Red, Green and Blue values are a color which is determined by the value of the voxel and the Alpha value is an opacity value corresponding to the opacity-adjusted value of the voxel.

12. The article of manufacture of claim 11 wherein the process further comprises looking up texels for each voxel associated with a non-transparent cell.

13. The article of manufacture of claim 12 wherein the process further comprises storing the texels associated with non-transparent cells in a data buffer.

14. The article of manufacture of claim 13 wherein the process further comprises downloading the contents of the data buffer to a textual memory.

15. The article of manufacture of claim 14 wherein the contents of the data buffer are downloaded when the data buffer is full.

16. A method for rendering a volume, the method being performed by a computer operating on data comprising a plurality of voxels, each voxel comprising a value representative of a parameter at a location within the volume, the method comprising:

a for each voxel, determining an opacity-adjusted value by applying an opacity curve to the value of the voxel;

partitioning the plurality of voxels among a plurality of slices;

for each slice, partitioning the plurality of voxels associated with that slice among a plurality of cells associated with that slice;

for each cell, setting an otherwise unset transparency flag associated with that cell if more than a predetermined number of the voxels associated with that cell have an opacity-adjusted value greater than a predetermined value;

storing in a buffer a texture value for each voxel for only those cells having a set transparency flag;

downloading the cells stored in the buffer into a texture memory;

unpacking the downloaded cells from the texture memory; and rendering the unpacked cells to the proper locations in space on a display device.

17. The method of claim 16 wherein the predetermined number is 0.

18. The method of claim 16 wherein the predetermined value is 0.

19. The method of claim 16 wherein downloading occurs when the data buffer is full.

20. The method of claim 16 wherein storing comprises storing connected cells in adjacent portions of the data buffer.

21. The method of claim 20 wherein storing connected cells comprises storing horizontally connected cells in adjacent portions of the data buffer.

22. The method of claim 20 wherein storing connected cells comprises storing vertically connected cells in adjacent portions of the data buffer.

23. The method of claim 20 further comprising rendering connected cells together.

24. Volume rendering apparatus adapted to be disposed in a workstation and responsive to data comprising a plurality of voxels, each voxel comprising an opacity-adjusted value representative of a value of a parameter at a location within the volume adjusted by applying an opacity curve to the value, the apparatus comprising:

first means for partitioning the voxels among a plurality of slices;

second means for partitioning the plurality of voxels associated with each slice among a plurality of cells associated with each slice;

third means for identifying non-transparent cells; and fourth means for rendering only the non-transparent cells.

25. The apparatus of claim 24 wherein the third means comprises means for identifying cells in which more than a predetermined number of the voxels have opacity-adjusted values greater than a predetermined value.

26. The apparatus of claim 25 wherein the predetermined number is 0.

27. The apparatus of claim 25 wherein the predetermined value is 0.

28. The apparatus of claim 24 further comprising fifth means for converting the voxels in only the non-transparent cells to texels.

29. The apparatus of claim 28 further comprising sixth means for storing in a data buffer the texels associated with only the non-transparent cells.

30. The apparatus of claim 29 further comprising seventh means for downloading from the data buffer to a textual memory only the texels associated with non-transparent cells.

31. The apparatus of claim 30 wherein the seventh means comprises means for downloading when the data buffer is full.

\* \* \* \* \*